Figure 3:
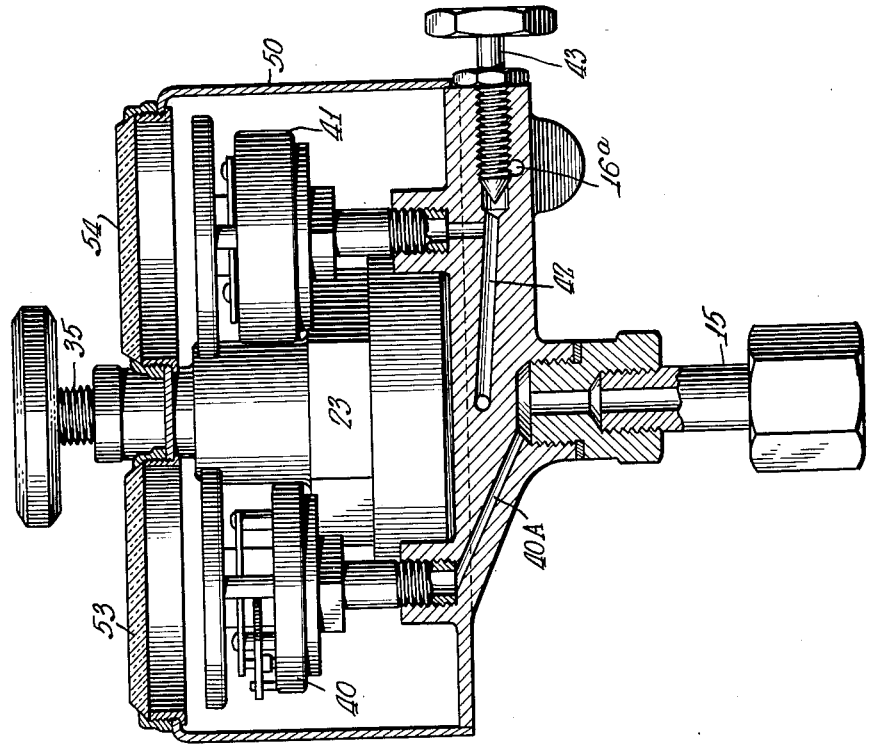

May 8, 1934.  E. L. MILLS  1,957,972
MULTISTAGE REGULATOR
Original Filed March 11, 1930   2 Sheets-Sheet 1
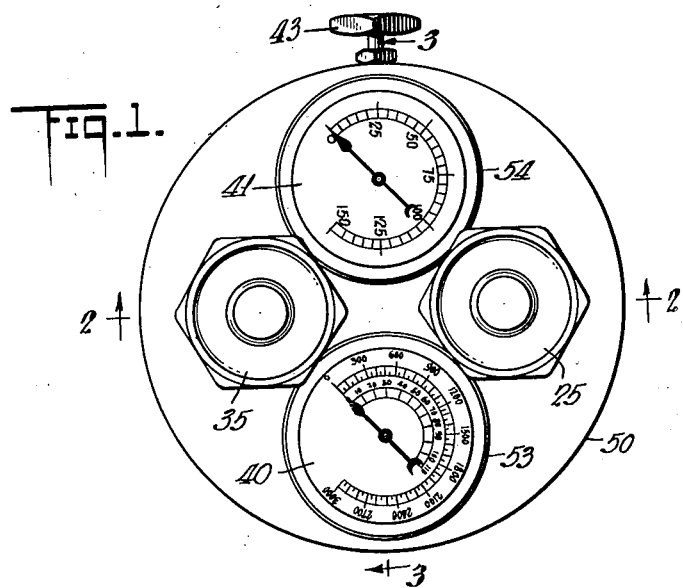
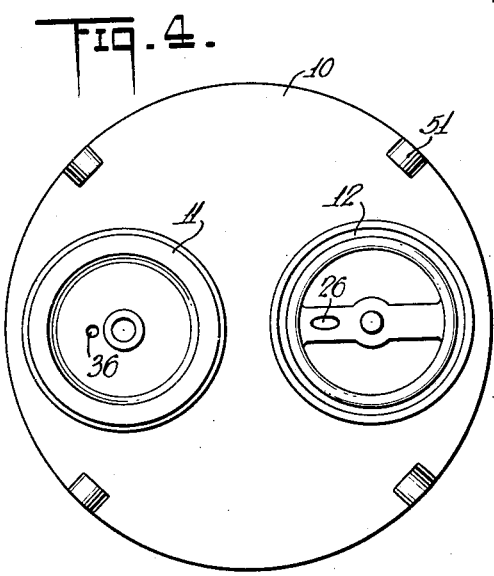
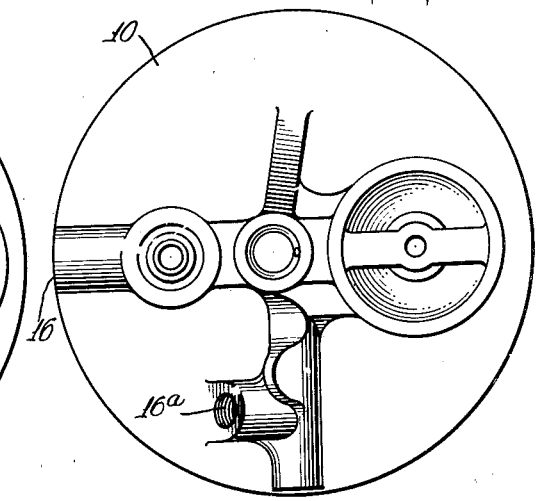
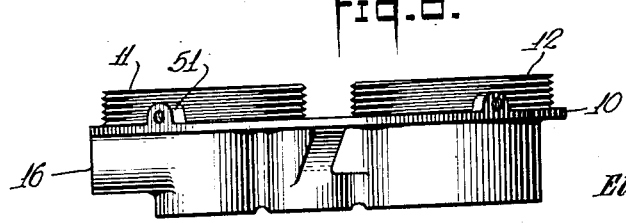
INVENTOR
*Ellsworth Luther Mills.*
BY
ATTORNEYS May 8, 1934.  E. L. MILLS  1,957,972
MULTISTAGE REGULATOR
Original Filed March 11, 1930  2 Sheets-Sheet 2

INVENTOR
*Ellsworth Luther Mills*
BY
*Dean Fairbanks Hirsch & Foster*
ATTORNEYS

Patented May 8, 1934

1,957,972

UNITED STATES PATENT OFFICE 1,957,972

MULTISTAGE REGULATOR

Ellsworth Luther Mills, Highland Park, Ill.

Application March 11, 1930, Serial No. 434,982
Renewed March 1, 1933

10 Claims. (Cl. 50—23)

This invention relates to fluid pressure regulating devices, and more particularly it pertains to such devices as are generally employed for controlling the pressures at which oxygen and a combustible gas such as acetylene are delivered to welding and cutting torches and similar devices.

Such gases are generally stored at high pressures in cylinders, and it is necessary that they be delivered at lower pressures in order that the proper size and character of flame may be produced and maintained at the torch tip.

For various reasons it is desirable to effect a multi-stage reduction of the high pressure of the storage cylinders to the lower pressure desired at the torch tip, and this has been accomplished by introducing a pair of regulators in series between the high pressure tanks and the torch. By this means, each regulator operates in a limited range and each may be designed to operate effectively in its range rather than being required to take care of the full drop which might be from 2000 pounds to a very few pounds or even ounces. The regulators are usually of the adjustable spring pressure diaphragm type, and it is customary to provide gauges by which a reading of the various pressures may be had.

Two types of regulators are in common use and have been employed for this purpose. In one type, which may be designated as the nozzle type, there are two sources of pressure tending to open the valve, namely, the gas at the high or supply pressure, acting directly on the valve, and a spring acting on the diaphragm connected to the valve. The gas at the outlet pressure acts on the diaphragm in opposition to the spring and the inlet pressure, and tends to close the valve. In this type of regulator a decrease in the inlet pressure due to the using up of the gas in the cylinder results in a decrease in the outlet pressure, assuming that the spring pressure remains constant. In the other type of regulator, which may be designated as the stem type, there are two sources of pressure tending to close the valve, namely, the inlet pressure acting directly on the valve and the outlet pressure exerted on the diaphragm which is connected to the valve. The spring acts against both pressures to open the valve. In this type a decrease in the inlet pressure causes an increase in the outlet pressure. In both types the lower or outlet pressure acts against the spring, but in one the inlet pressure tends to open the valve and in the other it tends to close the valve.

It is customary to connect the regulators and gauges together by unions, short lengths of pipe and the like, and mount them by direct attachment to the high pressure cylinders. Such practice, however, has proven unsatisfactory for the reason that the assemblage projects beyond the sides of the cylinders, where they are liable to injury as the cylinder is moved from place to place, and when in use. Furthermore, such a construction does not permit of proper distribution of the weight of the assemblage with relation to its point of attachment and support thereby producing strain at the various unions which often results in leaks at these points.

Two stage regulators combined to form a single article of manufacture have heretofore been designed, but so far as I am aware, all such proposed constructions have been subject to various objections including difficulty or impossibility of adjustment of one or both of the regulator stages to render each adaptable for operation in a wide pressure range, inaccessible for maintenance or repair of valves, valve seats and other parts subject to wear or deterioration, without taking substantially the entire regulator apart, and lack of adaptability to the use of standard regulator parts.

One object of the present invention is to provide a two stage regulator as a single article of manufacture which does not have the objections above referred to and which possesses many advantages and important features which will be hereinafter pointed out or will be apparent from a consideration of the specific embodiment to be described.

A further object of the invention is to so construct the device that the use of a multiplicity of unions and short lengths of pipe may be dispensed with, thus producing an apparatus which is compact, and in which the weight will be brought substantially over the center of support whereby the strain on the parts is reduced and stability is increased.

An important feature of the invention resides in the provision of a single supporting element which in itself forms a portion of the regulator casings, and which is constructed for the attachment of gauges, and other appliances.

As a further important feature, the parts are so designed that the operating elements, such as the valve and valve seats, are readily accessible for maintenance, adjustment, replacement or repair.

As a further important feature, both stages may be easily adjusted so that the maximum efficiency of the entire combination is obtained for each particular outlet pressure which may be desired.

As a further feature this supporting element is so designed that it forms a part of both regulators, but at the same time all of the other parts of both regulators may be of standard construction, design and proportions.

As a further feature this supporting member forms a support for a casing which encloses the operating parts, encloses the gauges, and includes the glass crystals of said gauges.

As a further important feature, the supporting element is provided with means for the attachment of supply and delivery conduits, and formed with passages so arranged that fluid entering from the supply conduit passes through the regulators and to the gauges before reaching the delivery conduit.

In the accompanying drawings, I have illustrated merely one embodiment of my invention in which are included many of the standard parts and details which have heretofore been employed in separate individual regulators.

Various changes may be made in details of construction and arrangement of the parts illustrated within the spirit of my invention and within the scope of the appended claims.

Figure 2:
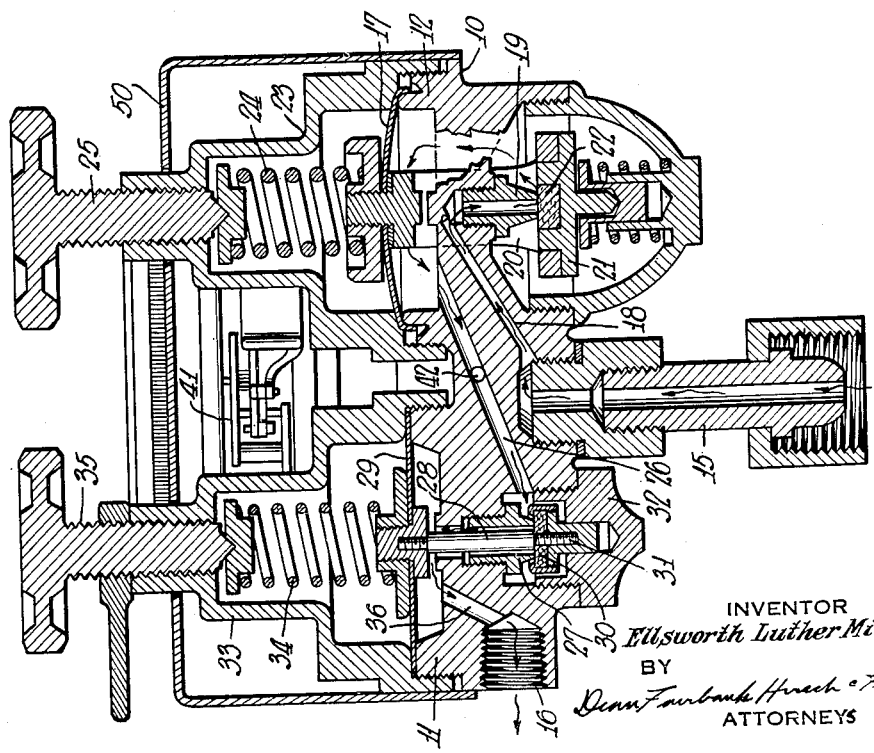

In the accompanying drawings:

Fig. 1 is a face view of a regulator assemblage constructed in accordance with the present invention, Fig. 2 is a transverse section taken on the line 2—2 of Fig. 1, Fig. 3 is a view partly in section and partly in elevation, taken on the line 3—3 of Fig. 1, certain portions of the mechanism being shown in elevation, Fig. 4 is a face view of the main supporting member, Fig. 5 is a back view of the member shown in Fig. 4, and Fig. 6 is an edge view of the member shown in Figs. 4 and 5.

In the construction illustrated, there is provided a main body portion or support 10 of plate or disc like form and of circular, oval or other desired shape. This body portion or support 10 is formed upon its front face with two outstanding flanges 11 and 12, adapted to have secured thereto bonnets for clamping the diaphragms and housing the springs. On the back face, the support has means for securing back caps for the valves. The support also provides all of the passages for the flow of the gas to and from the valves. The pressure regulator at the right of Fig. 2 is employed for stepping down the gas pressure from the high or inlet pressure to the intermediate pressure and is illustrated as a nozzle type, while the regulator at the left of Fig. 2 is employed for stepping down the intermediate pressure to the pressure desired for use at the torch tip, and this regulator is illustrated of the stem type.

The main body portion or support is provided with coupling means 15 for connecting an inlet conduit thereto and preferably this is on the back side at the center so that the support may be carried on a supply conduit and the parts arranged symmetrically about such support. The connection of the conduit for delivery of the gas to a welding torch may be at an outlet 16 on the periphery of the member 10 and to a cutting torch at outlet 16a.

The member 10 has a passage 18 from the inlet 15 whereby the high pressure gas is delivered to a nozzle 19, which faces away from and is coaxial with a diaphragm 17 on the front end of the flange 12. The diaphragm has connected thereto a yoke 20, the legs of which extend through holes in the member 10 and which carry a seat holder 21 having valve seat 22 adjacent to the end of the nozzle 19. The diaphragm is clamped in place by a bonnet 23 within which is mounted the diaphragm spring 24 and the spring tension adjusting means 25. When the intermediate pressure in the chamber beneath the diaphragm falls below a predetermined limit, the spring 24 plus the pressure of the gas in the nozzle 19, will act on the diaphragm and the valve seat to move the seat away from the nozzle and permit the delivery of high pressure gas to again raise the intermediate pressure. Leading from the said chamber to the second regulator is a passage 26 formed in the body portion or support 10.

The second regulator is of the stem type and has a nozzle 27 attached to the support 10 parallel to the nozzle 19 which is somewhat larger than the nozzle 19. It has extending therethrough a valve stem 28 which is connected to a diaphragm 29 on the flange 11. A valve seat 30 is attached to the valve stem by means of a seat holder 31, which is mounted for sliding movement in the cap 32 detachably secured to the support 10. A bonnet 33 is screwed to the flange 11 and acts as a diaphragm clamp as well as a casing for a spring 34 and a support for the usual spring tension regulating means 35.

The diaphragms 17 and 29 of the regulators are mounted on their respective circular flanges and together with the circular flanges, form the chambers of the regulators. A passage 36 in the support 10 establishes communication between the chamber of the second regulator and the outlet 16 which is connected to the hose leading to the welding torch.

In connection with such devices, it is customary to employ gauges for registering the pressures, for instance supply pressure in the storage cylinders, and the pressure of the gas between the two stages. In the present illustration of the invention two gauges are carried directly by the support 10. The gauge 40 is for registering the high pressure and the gauge 41 is for registering the intermediate pressure. The high pressure gauge 40 has communication with the supply passage 18 by means of a passage 40a extending through the main body portion or support. The intermediate pressure gauge 41 is employed for registering the pressure at which the gas is delivered from the first regulator to the second regulator and it communicates with the passage 26 by means of a passage 42. This passage 42 leads to the outlet 16a and adjacent to the outlet is a shut-off valve preferably of the needle type.

In use, the supply conduit 15 is connected directly to a cylinder in which the gas is stored under high pressure. The gas passes through the conduit and the passage 18 to the first regulator where the first stage reduction takes place and from there it is delivered by the passage 26 to the second regulator where the second stage of reduction takes place, from whence it is delivered by means of the passage 36 to the delivery conduit connection 16 by which it is conveyed to the torch. The outlet 16a may be connected to the hose for the cutting oxygen of a cutting torch.

To partially enclose the regulators and wholly enclose the gauges, in order that the several parts may be protected, a housing 50 is provided. This is preferably of sheet metal with a flat face and a cylindrical peripheral wall removably secured by screws to lugs 51 on the main body portion or support 10. It encloses the bonnets 23 and 33, but has openings through which the upper extremity of these bonnets may project, whereby the spring adjusting members 25 and 35 may be operated. The housing 50 is provided with windows 53 and 54 which are so positioned that they overlie the gauges 40 and 41 respectively when the cover is in place and afford means by which reading of the gauges through the top wall of the housing 50 is possible. They serve as the crystals for the gauges and the housing 50 serves as a casing for both gauges so that upon the removal of the housing all of the operating parts of the gauges are exposed and accessible for adjustment or repair.

The several parts are enclosed and therefore it is not necessary to provide individual housings for the gauges.

In my improved construction by location of the supply conduit connection which forms the means for attachment of the device to a gas cylinder, substantially in the center of the main body portion or support 10, the weight of the assemblage is located substantially about the center of the support. The strain on the several parts is thereby reduced and stability is increased. Furthermore, with such a construction, there are no projecting parts which are liable to injury as the cylinder is moved from place to place or during use thereof. Access to either valve may be gained in the event of need for repair or replacement by removing the corresponding cap without removing the housing 50 or bonnets 23 or 33 or diaphragms 17 and 29, and likewise the diaphragm springs may be adjusted so that the maximum efficiency of the entire combination may be obtained for each desired outlet pressure. The housing presents a smooth surface readily cleaned and preventing the accumulation of dust and dirt on the various parts which by reason of their shape are usually hard to keep clean.

One of the most important functions of the housing is its protection of the gauges. In ordinary commercial constructions of the types heretofore commonly employed the gauges project to a considerable distance from the regulator and are very easily broken off or injured in the careless handling of the gas cylinder with the regulator and gauges attached. In my improved construction the gauges are disposed in closely compact relationship to the bonnets 23 and are therefore in part protected by the bonnets as well as being entirely enclosed in and protected by the housing 50. The gauges do not extend in any direction beyond the outer limits of the rigid body parts of the regulator.

In my improved construction I have shown two regulators of different types and this is desirable, but so far as concerns the compactness, the protection to the gauges and other important features of the invention, it is evident that the two regulators may both be of the nozzle or both of the stem type, if desired.

Having thus described my invention, what I claim as new and desire to secure by Letters Patent is:

1. A multi-stage pressure regulator including a plate-like support having a pair of openings therethrough, a pair of removable caps secured to one side of said support over said apertures, a pair of removable bonnets secured to said support upon the opposite side over said apertures, said bonnets and caps cooperating with said support to form a pair of pressure chambers, said support having a passage therethrough connecting said chambers in series, a valve in each of said chambers, diaphragms secured to said support to close said openings and subdivide each of said chambers into two compartments, said diaphragms being held in place by said bonnets, each diaphragm being connected to its corresponding valve for controlling operation of the latter, springs housed within said bonnets and acting on said diaphragms, a casing having a peripheral wall and an end wall, pressure gauges enclosed within said casing, means for securing the edge of said peripheral wall to said support, means projecting through said bonnets and the end wall of said casing for regulating the pressure on said springs, and separate windows in said end wall registering with the dials of said gauges.

2. A multi-stage pressure regulator including a plate-like supporting member having a pair of openings therethrough, a pair of removable caps secured to one side of said member over said apertures, a pair of removable bonnets secured to said member upon the opposite side over said apertures, said bonnets and caps cooperating with said member to form a pair of pressure chambers, a valve in each of said chambers, diaphragms serving to subdivide said chambers into two separate compartments, each diaphragm being connected to its corresponding valve for controlling the operation of the latter, and springs housed within said bonnets and acting on said diaphragms, one tending to open one of said valves with the flow of incoming gas and another tending to open the other of said valves against the flow of incoming gas, said member having passages connecting the compartments within said caps in series.

3. A multi-stage regulator including a plate having a pair of openings therethrough, diaphragms disposed in substantially the same plane and closing said openings, separate removable caps on one side of said plate and cooperating with said plate to form chambers each closed at one end by a corresponding diaphragm, valves in said chambers, a spring acting on one of said diaphragms and tending to open the valve connected thereto with the flow of incoming gas, a spring acting on the other of said diaphragms and tending to open the valve connected thereto against the flow of incoming gas, and means for connecting said chambers in series.

4. A multi-stage regulator including a disc serving as a supporting element and having two openings therethrough, diaphragms disposed in substantially the same plane for closing said openings, valves on one side of said disc and connected to said diaphragms, means for connecting said valves in series, means at the opposite side of said disc for regulating the operation of said diaphragms, a pressure gauge on the last mentioned side of the disc and having a dial substantially parallel to the disc, and a casing having a peripheral wall and an end wall, the edge of said peripheral wall being secured to the periphery of said disc and said end wall having a window closely juxtaposed to and parallel with the dial of said gauge, said diaphragm regulating means extending through the end wall of said casing adjacent to said window.

5. A multi-stage regulator including a plate-like supporting member, means detachably secured thereto at one side thereof and cooperating therewith to form a pair of pressure chambers, valves within said chambers, means for connecting said chambers in series, a pressure gauge on the opposite side of said supporting member and having a dial substantially parallel to the plane of the latter, said gauge being connected to one of said chambers, and a casing having a peripheral wall detachably secured to the periphery of said supporting member and an end wall parallel to said supporting member, said end wall having a window closely adjacent to and parallel with the dial of said gauge.

6. A multi-stage pressure regulator including a plate-like supporting element, a pair of chambers upon one side thereof and having pressure regulating valves therein, one wall of each chamber comprising a diaphragm for operating one of the valves, a plurality of pressure gauges carried by said supporting element upon the opposite side thereof from said chambers, means for connecting supply and delivery conduits to said supporting element, passages formed in said supporting element for establishing communication between said supply and delivery conduit connections, through said chambers and to said gauges, said gauges having their dials substantially parallel to said supporting element, a housing detachably secured to said supporting element and having in the end wall thereof windows parallel to and closely juxtaposed to said dials, and means extending through said end wall for regulating the operation of said diaphragms.

7. A multi-stage regulator including a plate-like supporting member, separate caps detachably secured thereto at one side thereof and cooperating therewith to form a pair of pressure chambers, valves within said chambers, diaphragms for actuating said valves, means for connecting said chambers in series, a pressure gauge on the opposite side of said supporting member from said caps and connected to one of said chambers, and a casing having a peripheral wall detachably secured to the periphery of said supporting member and having a window closly adjacent to and parallel with the dial of said gauge.

8. A multi-stage regulator including a supporting element having a pair of openings therethrough, diaphragms closing said openings, separate removable caps on one side of said supporting element and cooperating with the latter to form chambers, each closed at one end by a corresponding diaphragm, valves in said chambers, springs upon the opposite side of said supporting element and acting on said diaphragm, a pressure gauge secured to said supporting element on the last mentioned side, a casing detachably secured to said supporting element and enclosing said gauge and having a window adjacent to and substantially parallel with the dial of the gauge, and a pair of handles extending through said casing adjacent to said window for regulating the tension of said springs.

9. A two stage regulator for controlling the supply of gas to a cutting or welding torch, including a circular supporting member having a nozzle carried thereby and a passage therethrough, said nozzle and passage being substantially parallel, delivering in opposite directions and spaced apart along a diameter of said member, said member having annular valve seat encircling said passage and on the same side of said member as said nozzle, a valve member movable toward said nozzle against the direction of gas flow to close said nozzle, a second valve member movable toward said valve seat in the direction of gas flow to close said passage, a diaphragm cooperating with said supporting member to form an intermediate pressure chamber into which said nozzle delivers, a second diaphragm cooperating with said supporting member to form a delivery or low pressure chamber into which the outlet of said passage delivers, operative connection in said first chamber between said first diaphragm and said first valve member, operative connection between said second diaphragm and said second valve member, and extending through said passage, and separate springs outside of said chambers acting on said diaphragms and tending to move said valve members to open positions.

10. A two stage regulator for controlling the supply of gas to a cutting or welding torch, including a circular supporting member having a nozzle carried thereby and a passage therethrough, said nozzle and passage being substantially parallel, delivering in opposite directions and spaced apart along a diameter of said member, said member having an annular valve seat encircling said passage and on the same side of said member as said nozzle, a valve member movable toward said nozzle against the direction of gas flow to close said nozzle, a second valve member movable toward said valve seat in the direction of gas flow to close said passage, a diaphragm cooperating with said supporting member to form an intermediate pressure chamber into which said nozzle delivers, a second diaphragm cooperating with said supporting member to form a delivery or low pressure chamber into which the outlet of said passage delivers, operative connection in said first chamber between said first diaphragm and said first valve member, operative connection between said second diaphragm and said second valve member, and extending through said passage, separate springs outside of said chambers acting on said diaphragms and tending to move said valve members to open positions, and an auxiliary spring in said first chamber, acting on said first valve member and tending to move the latter to closed position.

ELLSWORTH LUTHER MILLS.